United States Patent
Baek et al.

(10) Patent No.: US 10,305,561 B2
(45) Date of Patent: May 28, 2019

(54) COMMUNICATION METHOD AND APPARATUS USING BEAMFORMING

(71) Applicant: Samsung Electronics Co., Ltd., Suwon-si, Gyeonggi-do (KR)

(72) Inventors: Sang-Kyu Baek, Suwon-si (KR); Young-Bin Chang, Anyang-si (KR); Sang-Wook Kwon, Yongin-si (KR); Young-Joong Mok, Suwon-si (KR); June Hwang, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 14/952,299

(22) Filed: Nov. 25, 2015

(65) Prior Publication Data
US 2016/0150435 A1 May 26, 2016

(30) Foreign Application Priority Data
Nov. 26, 2014 (KR) .................. 10-2014-0166474

(51) Int. Cl.
*H04B 7/06* (2006.01)
*H04W 16/28* (2009.01)
(Continued)

(52) U.S. Cl.
CPC .......... *H04B 7/0617* (2013.01); *H04B 7/0602* (2013.01); *H04B 7/0608* (2013.01);
(Continued)

(58) Field of Classification Search
CPC ............ H04B 7/0897; H04W 36/0083; H04W 36/0094
See application file for complete search history.

(56) References Cited

U.S. PATENT DOCUMENTS

| | | | |
|---|---|---|---|
| 2009/0245411 A1 | 10/2009 | Goldberg | |
| 2013/0021929 A1* | 1/2013 | Kim ...................... | H04B 7/024 370/252 |

(Continued)

FOREIGN PATENT DOCUMENTS

| | | |
|---|---|---|
| KR | 10-2013-0132339 A | 12/2013 |
| KR | 10-2014-0092165 A | 7/2014 |
| WO | 2013/066220 A1 | 5/2013 |

*Primary Examiner* — Salvador E Rivas
(74) *Attorney, Agent, or Firm* — Jefferson IP Law, LLP

(57) ABSTRACT

The present disclosure relates to a pre-$5^{th}$-generation (5G) or 5G communication system to be provided for supporting higher data rates beyond $4^{th}$-generation (4G) communication system such as long term evolution (LTE). A communication method and apparatus using beamforming are provided. The method includes acquiring transmission beam specific, measurement information of a base station (BS) and measuring a reference signal (RS) transmitted through transmission beams of the BS according to the transmission beam specific, measurement information. The measurement information on each transmission beam is determined according to at least one of an elevation angle of the corresponding transmission beam, an azimuth of the corresponding transmission beam, a handover urgency, information on a handover failure, and information on a radio link failure (RLF). A mobile station (MS) may perform a measurement report or a handover process according to a result of the measurement.

18 Claims, 15 Drawing Sheets

(51) Int. Cl.
*H04W 36/00* (2009.01)
*H04L 5/00* (2006.01)
*H04W 24/08* (2009.01)
*H04W 24/10* (2009.01)
*H04B 14/00* (2006.01)
*H04W 36/30* (2009.01)

(52) U.S. Cl.
CPC ........... *H04L 5/0048* (2013.01); *H04W 16/28* (2013.01); *H04W 24/08* (2013.01); *H04W 24/10* (2013.01); *H04W 36/0083* (2013.01); *H04B 14/006* (2013.01); *H04W 36/0085* (2018.08); *H04W 36/00837* (2018.08); *H04W 36/305* (2018.08)

(56) References Cited

U.S. PATENT DOCUMENTS

| | | | |
|---|---|---|---|
| 2013/0155847 A1* | 6/2013 | Li | H04W 24/04 370/225 |
| 2013/0315083 A1 | 11/2013 | Jung | |
| 2014/0187171 A1* | 7/2014 | Xiao | H04B 7/0617 455/67.11 |
| 2014/0198681 A1 | 7/2014 | Jung et al. | |
| 2014/0295840 A1* | 10/2014 | Keskitalo | H04W 36/0061 455/436 |
| 2015/0236772 A1* | 8/2015 | Hammarwall | H04B 7/0617 370/329 |
| 2015/0381252 A1* | 12/2015 | Kang | H04B 7/024 370/329 |
| 2017/0164248 A1* | 6/2017 | Weber | H04W 36/0072 |

* cited by examiner

COMMUNICATION METHOD AND APPARATUS USING BEAMFORMING

CROSS-REFERENCE TO RELATED APPLICATION(S)

This application claims the benefit under 35 U.S.C. § 119(a) of a Korean patent application filed on Nov. 26, 2014 in the Korean Intellectual Property Office and assigned Serial number 10-2014-0166474, the entire disclosure of which is hereby incorporated by reference.

TECHNICAL FIELD

The present disclosure relates to a method and apparatus for efficiently measuring a reference signal (RS) transmitted from a base station (BS) in a communication system using beamforming

BACKGROUND

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier(FBMC), non-orthogonal multiple access (NOMA), and sparse code multiple access (SCMA) as an advanced access technology have been developed.

In order to meet traffic demands of wireless data which has continuously increased, the wireless communication system has been developed in a direction for supporting a higher data transmission rate. A currently developed wireless communication system seeks to develop a technology that mainly improves a spectral efficiency to increase a data transmission rate. However, it is difficult to meet the traffic demands of wireless data that have increased heavily through improvement of the spectral efficiency alone.

One of the other methods to increase the traffic demands of wireless data is to use a frequency band of a very wide bandwidth. A frequency band used in a conventional mobile communication cellular system generally corresponds to 10 GHz or lower, thereby having difficulty in securing the wide frequency band. Accordingly, it is required to secure a broadband frequency in a higher frequency band to increase data capacity. However, as the frequency for wireless communication increases, a propagation path loss increases and, accordingly, a propagation arrival distance becomes relatively short and a service area (coverage) becomes reduced. Beamforming technology is one of the important technologies for mitigating the propagation path loss and solving the reduction in the propagation arrival distance.

Beamforming may be divided into transmission beamforming performed by a transmitting end, and reception beamforming performed by a receiving end. In general, transmission beamforming increases directivity by concentrating a propagation arrival area in a particular direction by using a plurality of antennas. A form in which the plurality of antennas are arranged may be referred to as an antenna array, and each antenna included in the array may be referred to as an array element. The antenna array may be configured in various types such as a linear array and a planar array. When transmission beamforming is used, a transmission distance increases through an increase in signal directivity. Further, since the signal is hardly transmitted in another direction other than the directed direction, signal interference for another receiving end significantly decreases. The receiving end may perform beamforming for a received signal by using a reception antenna array. Reception beamforming concentrates reception of radio waves in a particular direction to increase received signal sensitivity incident from the corresponding direction and excludes signals incident from directions other than the corresponding direction from the received signal to provide a gain in blocking an interference signal.

As described above, in order to secure a wide frequency band, an ultra-high frequency, that is, a millimeter (mm) wave system is expected to be introduced, in which case a beamforming technology for overcoming the propagation path loss is being considered.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provides a method and apparatus for transmitting/receiving information in a communication system.

Another aspect of the present disclosure is to provide a method and apparatus for efficiently measuring a base station (BS) signal in a beamforming communication system.

Another aspect of the present disclosure is to provide a method and apparatus for reducing handover failure in a beamforming communication system.

Another aspect of the present disclosure is to provide a method and apparatus for configuring measurement parameters for a transmission beam in a beamforming communication system.

In accordance with an aspect of the present disclosure, a communication method using beamforming is provided. The communication method includes receiving a measurement report generated according to transmission beam specific, measurement information of a base station (BS) from a mobile station (MS), wherein the measurement information on each transmission beam is determined according to at least one of an elevation angle of the corresponding transmission beam, an azimuth of the corresponding transmission beam, a handover urgency, information on a handover failure, and information on a radio link failure (RLF).

In accordance with another aspect of the present disclosure, a communication method using beamforming is provided. The communication method includes acquiring transmission beam specific, measurement information of a BS, and measuring a reference signal (RS) transmitted through transmission beams of the BS according to the transmission beam specific, measurement information, wherein the measurement information on each transmission beam is determined according to at least one of an elevation angle of the corresponding transmission beam, an azimuth of the corresponding transmission beam, a handover urgency, information on a handover failure, and information on an RLF.

In accordance with another aspect of the present disclosure, a BS apparatus for performing communication by using beamforming is provided. The BS apparatus includes a receiver that receives a signal from an MS, and a controller that acquires a measurement report generated by the MS according to transmission beam specific, measurement information of the BS from the received signal, wherein the measurement information on each transmission beam is determined according to at least one of an elevation angle of the corresponding transmission beam, an azimuth of the corresponding transmission beam, a handover urgency, information on a handover failure, and information on an RLF.

In accordance with another aspect of the present disclosure, an MS apparatus for performing communication by using beamforming is provided. The MS apparatus includes a receiver that receives a signal of a BS, and a controller that acquires transmission beam specific, measurement information of the BS and measures an RS transmitted through transmission beams of the BS according to the transmission beam specific, measurement information, wherein the measurement information on each transmission beam is determined according to at least one of an elevation angle of the corresponding transmission beam, an azimuth of the corresponding transmission beam, a handover urgency, information on a handover failure, and information on an RLF.

Other aspects, advantages, and salient features of the disclosure will become apparent to those skilled in the art from the following detailed description, which, when taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
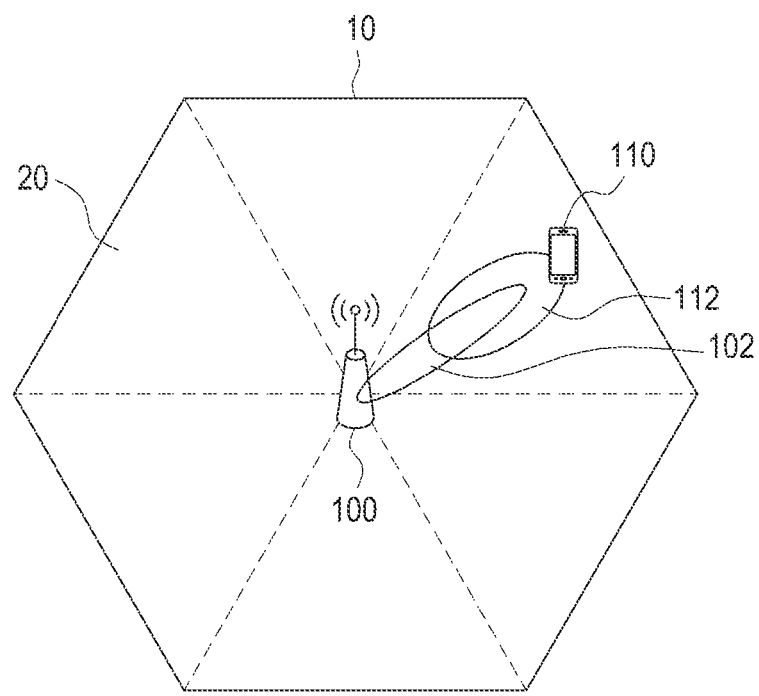
FIG. 1 illustrates an example of a beamforming-based signal transmission/reception scenario according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definition and should not be construed as possessing an excessively limited meaning.

In addition, a singular expression used in the specification includes a plural expression as long as they are clearly distinguished in the context. In the present disclosure, the term "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by the terms. The terms are used merely for the purpose to distinguish an element from the other elements. For example, a first element may be termed a second element, and similarly, a second element may be termed a first element without departing from the scope of the present disclosure.

In the case where an element is referred to as being "connected" or "accessed" to other elements, it should be understood that not only the element is directly connected or accessed to the other elements, but also another element may exist between them. Meanwhile, in the case where a component is referred to as being "directly connected" or "directly accessed" to other component, it should be understood that there is no component there between.

Hereinafter, various embodiments of the present disclosure will be described in detail with reference to the accompanying drawings, equal or similar elements are assigned an equal reference numeral, and an overlapping description thereof will be omitted. Further, in the following description of the present disclosure, a detailed description of known technologies incorporated herein will be omitted when it may make the subject matter of the present disclosure unclear. Further, it should be noted that the accompanying drawings are intended only for the easy understanding of the technical idea of the present disclosure, and the spirit of the present disclosure should not be construed as being limited by the accompanying drawings. In addition to the accompanying drawings, the spirit of the present disclosure should be construed to cover all modifications, equivalents, and alternatives thereof.

In the following description of the drawings, a base station (BS) and mobile station (MS) will be used, but the BS may be referred to as an evolved node B (eNB) and the MS may be referred to as a terminal, mobile equipment (ME), user equipment (UE), user terminal (UT), subscriber station (SS), wireless device, handheld device, or access terminal (AT). Further, the MS may be a device with a communication function, such as a cellular phone, a personal digital assistant (PDA), a smart phone, a wireless modem, or a notebook.

In an ultrahigh frequency band wireless communication system, the beamforming may be used to overcome a large propagation loss and a large penetration loss which occur due to a channel propagation characteristic of an ultrahigh frequency band.

FIG. 1 illustrates an example of a beamforming-based signal transmission/reception scenario according to an embodiment of the present disclosure.

Referring to FIG. 1, a base station (BS) 100 has a service area including one cell 10 and a plurality of sectors 20 pertaining to the cell 10. The number of sectors 20 included in one cell 10 may be one or more. The BS 100 may operate multiple beams according to each sector 20 of the cell 10. In order to support one or more MSs while acquiring a beamforming gain, the BS 100 may form one or more transmission beams/reception beams for a downlink/uplink while simultaneously or sequentially sweeping them in different directions.

For example, the BS 100 may simultaneously form N transmission beams directed in N directions for N slots. In another example, the BS 100 sequentially forms N transmission beams directed in N directions for N slots. This is referred to as sweeping. Specifically, a first transmission beam 102 is formed only in a first slot, a second transmission beam (not shown) is formed only in a second slot, an $i^{th}$ transmission beam (not shown) is formed only in an $i^{th}$ slot, and an $N^{th}$ transmission beam (not shown) is formed only in an $N^{th}$ slot.

Due to a structural limitation, the MS 110 may be implemented to operate a wide beam width supporting a smaller beam gain in comparison with the BS 100 in general. In some implementations, the MS 110 can support one or more transmission beams/reception beams 112 for the downlink/uplink.

In the downlink, the beamforming is performed based on transmission beamforming of the BS or a combination of the transmission beamforming of the BS and reception beamforming of the MS. For the downlink beamforming, a best beam pair of one or more BS transmission beams and one or more MS reception beams generated in various directions according to a structure of each of the MS and the BS should be selected and then a downlink beam tracking process in which both the BS and the MS recognize information on the beam pair should be performed. In order to select the best beam pair of the transmission beams of the BS and the reception beams of the MS in the downlink, a measurement value of a reference signal (RS) transmitted from the BS may be used.

Figure 2:
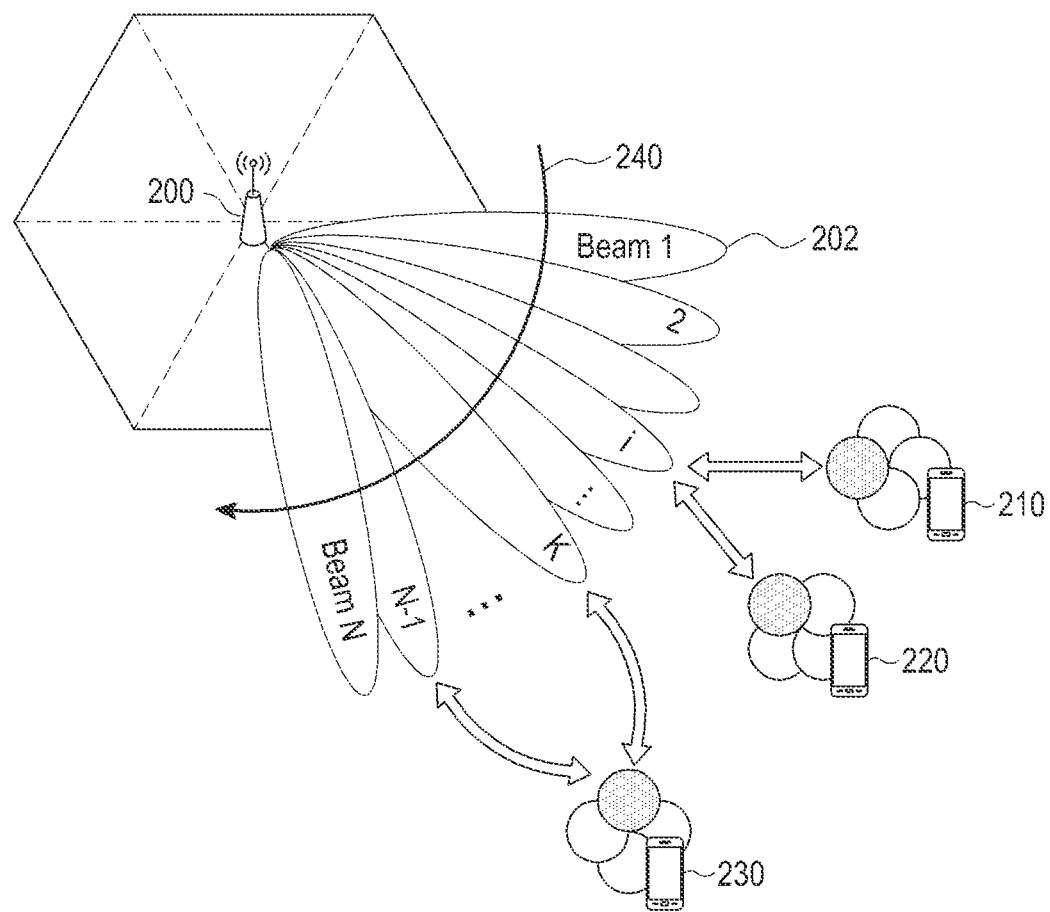
FIG. 2 illustrates an example of beamforming-based communication between a base station (BS) and a mobile station (MS) according to an embodiment of the present disclosure.

FIG. 2 illustrates an example of beamforming-based communication between the BS and the MS. Within one sector for the downlink (DL)/uplink (UL), a BS 200 may operate a plurality of transmission/reception beams 202 directed in different directions and each of MSs 210, 220, and 230 may support one or more transmission/reception beams according to an embodiment of the present disclosure.

Referring to FIG. 2, the BS 200 may simultaneously transmit a plurality of beamformed signals (that is, transmission beams) in different directions or form one or more transmission beams directed in different directions while sequentially sweeping them to transmit signals through the transmission beams as indicated by a reference numeral 240.

According to the implementation for guaranteeing as high a beamforming gain as possible under a limitation due to a form and complexity, the MSs 210, 220, and 230 may support omnidirectional reception while not supporting reception beamforming, apply only one particular beamforming pattern at a time while supporting the reception beamforming, or simultaneously apply a plurality of beamforming patterns in different directions while supporting the reception beamforming.

Each MS may feedback a best transmission beam selected from a plurality of transmission beams of the BS 200 based a measurement result of the transmission beam specific RS or the measurement result to the BS 200, and the BS 200 may transmit a particular signal by using the selected best transmission beam to each MS. Each MS supporting the reception beamforming measures channel quality of each beam pair according to a plurality of reception beams of the MS, selects one best pair, several top pairs, or all pairs from the pairs of the BS reception beams and the MS transmission beams, manages the selected pairs, reports the pairs to the BS, and receives a signal by using a proper beam pair according to conditions.

Under multi-access in which the plurality of MSs 210, 220, and 230 access the BS 200, the BS 200 may notify each of the MSs 210, 220, and 230 of resource allocation used for data transmission. A control channel indicating resources allocated to each of the MSs 210, 220, and 230 is referred to as a scheduling allocation channel or a physical downlink control channel (PDCCH). Within a subframe corresponding to a time unit of transmission, the scheduling allocation channel and data may be multiplexed in a time division multiplexing (TDM) type. According to an embodiment of the present disclosure, the subframe may be a transmission unit equal to a scheduling period unit.

Figure 3:
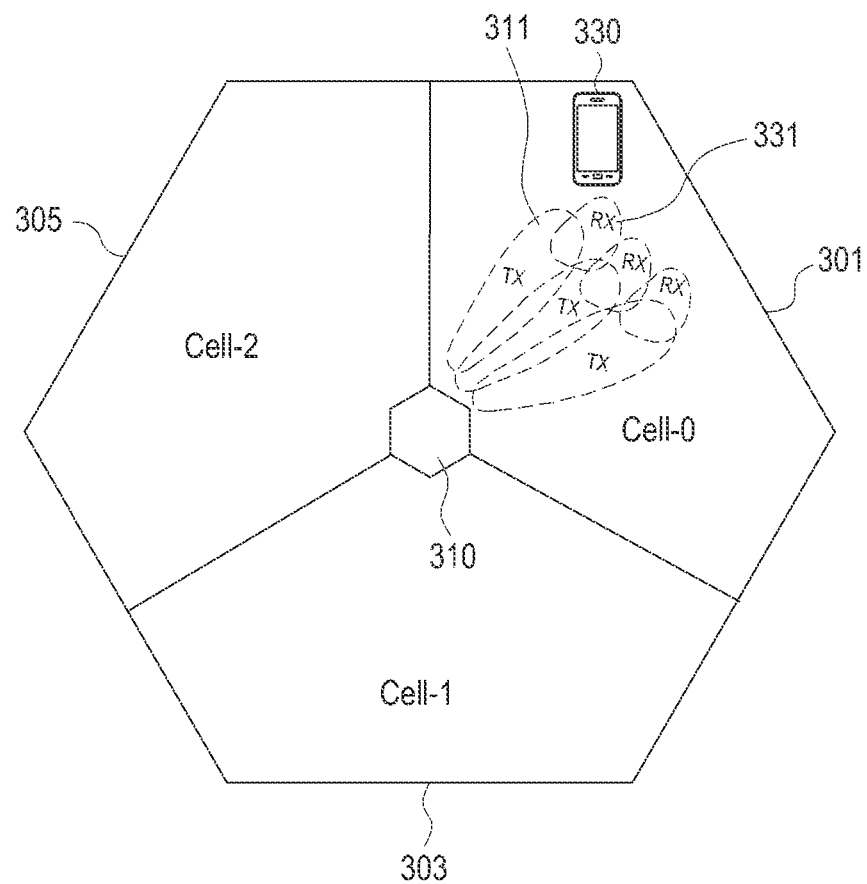
FIG. 3 illustrates a structure of a mobile communication system including a BS and an MS, providing beamforming using an array antenna according to an embodiment of the present disclosure.

FIG. 3 illustrates a structure of a mobile communication system including a BS and an MS, providing beamforming using an array antenna according to an embodiment of the present disclosure.

Referring to FIG. 3, a BS 310 may transmit a signal while changing a direction of a transmission beam 311 through a plurality of array antennas in every cell (or sector) 301, 303, and/or 305. Further, an MS 330 may also receive a signal from the BS 310 while changing a direction of a reception beam 331.

When the number of transmission beams which can be transmitted by the BS 310 is N and the number of reception beams which can be received by the MS 330 is M in the beamforming scheme, an example of a simple method of selecting a best downlink transmission and reception beam pair is as described below. That is, the BS 310 transmits a signal (for example, an RS), which has been arranged at least M times through N transmission beams, and the MS 330 receives a signal transmitted through each of the N transmission beams by using M reception beams. In order to select the best transmission and reception beam pair, the BS 310 transmits the RS at least N×M times, and the MS 330 receives the RS at least N×M times, and measures a signal strength (or signal quality) for each beam pair. The MS 330 may determine a transmission beam and a reception beam, which show a strongest measurement value among the N×M measurement values, as the best transmission and reception beam pair.

A measurement time reduction scheme may be applied to reduce the time required for the measurement. For example, the measurement time reduction scheme may include a method of grouping a predetermined number of beams and performing measurement.

As described above, the process in which the BS transmits the signal in a plurality of transmission directions one or more times is referred to as beam sweeping and the process in which the MS selects the best transmission and reception beam direction is referred to as beam selection. The process for selecting the best downlink transmission and reception beam may be applied to the uplink in which the MS transmits the signal to the BS.

In a general cellular system, the BS transmits a downlink RS by using particular resources reserved for a sync channel (SCH) or an RS. The RS is repeatedly transmitted one or more times by using sufficient transmission power to allow all MSs existing within the service area (coverage) of the BS to receive the RS. In order to transmit the RS to the entire service area of the BS in a mobile communication system in which communication is performed using the beamforming scheme, the RS should be transmitted one or more times in all directions in which the RS can be transmitted in the aforementioned beaming sweeping scheme. The number of times by which the RS should be transmitted in the beam sweeping scheme may be proportional to the number of transmission beams which can be operated by the BS.

Figure 4:
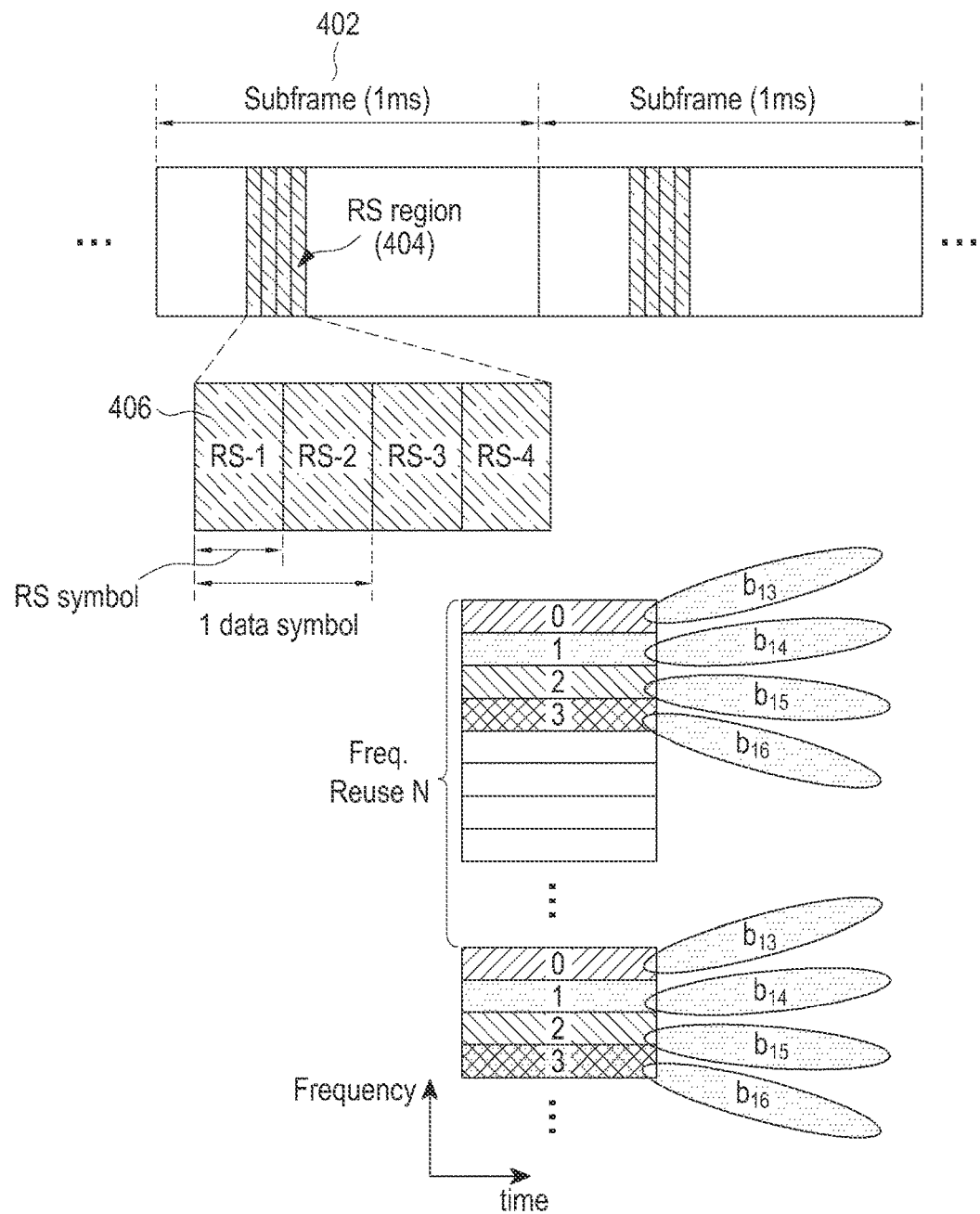
FIG. 4 illustrates an example of a frame structure for RS transmission according to an embodiment of the present disclosure.

FIG. 4 illustrates an example of a frame structure for RS transmission according to an embodiment of the present disclosure.

Referring to FIG. 4, a subframe 402 of a predetermined time unit (for example, 1 millisecond (ms)) includes a downlink area 404 designated for transmitting an RS 406 according to each cell/sector. The RS 406 includes pilot signals mapped to beams in different directions. In the example shown in FIG. 4, the RS 406 includes four RS symbols RS-1 to RS-4, each of the RS symbols includes four pilot signals distinguished by frequencies, and each of the pilot signals is mapped to one beam. That is, the fourth RS symbol includes pilot signals mapped to beams $b_{13}$ to $b_{16}$.

The MS may measure signal quality of one particular beam from the pilot signal mapped to each beam or measure signal quality of a beam group from a combination of pilot signals mapped to the beam group. Based on the measurement (or estimation), the MS measures, updates, and predicts instant or temporal average/variance/standard deviation of a signal quality metric such as a carrier to interference and noise ratio (CINR), a receive signal strength indicator (RSSI), received signal code power (RSCP), reference signal received power (RSRP), and reference signal received quality (RSRQ). According to another embodiment of the present disclosure, the MS may estimate a channel variation against the time/frequency based on the measurement for the RS to estimate a mobility value such as a Doppler speed proportional to a movement speed of the MS, and indirectly predict the movement speed of the MS and a sensitivity increase a possibility of beams based on the estimated value.

The MS may determine whether to make a measurement report according to a trigger condition set by the BS based on the measurement/estimation value of the signal quality and feedback the measurement/estimation value of the signal quality or the measurement report including information related to the measurement/estimation value to the BS according to a result of the determination. The BS may evaluate beam specific, measurement values for the MS according to a request and report from the MS and, accordingly, determine whether to perform switching between beams or a handover between BSs/sectors. The BS may broadcast and/or unicast the trigger condition required for the measurement report and at least one of the parameters used for the measurement report to MSs within the cell periodically and/or aperiodically.

Figure 5:
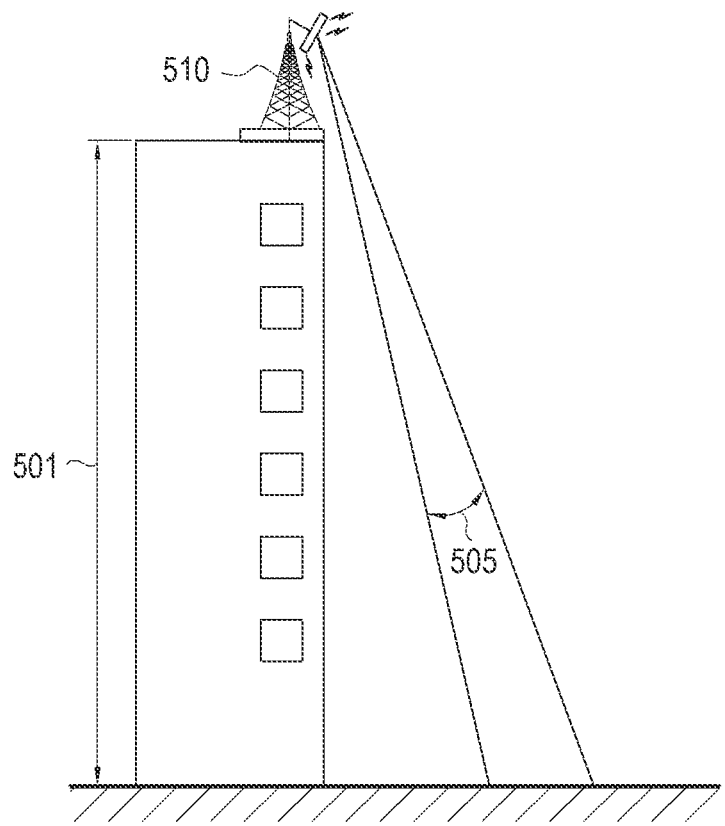
FIG. 5 illustrates characteristics of a transmission beam in a beamforming communication system according to an embodiment of the present disclosure.

FIG. 5 illustrates characteristics of a transmission beam in a beamforming communication system according to an embodiment of the present disclosure.

Referring to FIG. 5, a BS 510 is installed in a location having a height 501 somewhat apart from the ground and may transmit a beam 505 having a predetermined beam width. The beam of the BS 510 may be defined by an elevation angle and an azimuth. The elevation angle refers to an angle between a main direction and a vector directed toward the center of the earth from a start point. The azimuth refers to an angle indicating a horizontal direction in which the transmission beam 505 is propagated and may include, for example, an angle between the projected vector for the ground in the main direction of the transmission beam 505 and a straight line directed in a particular direction. In addition, the beam angle may be defined in various other methods and configurations as convenient.

Figure 6:
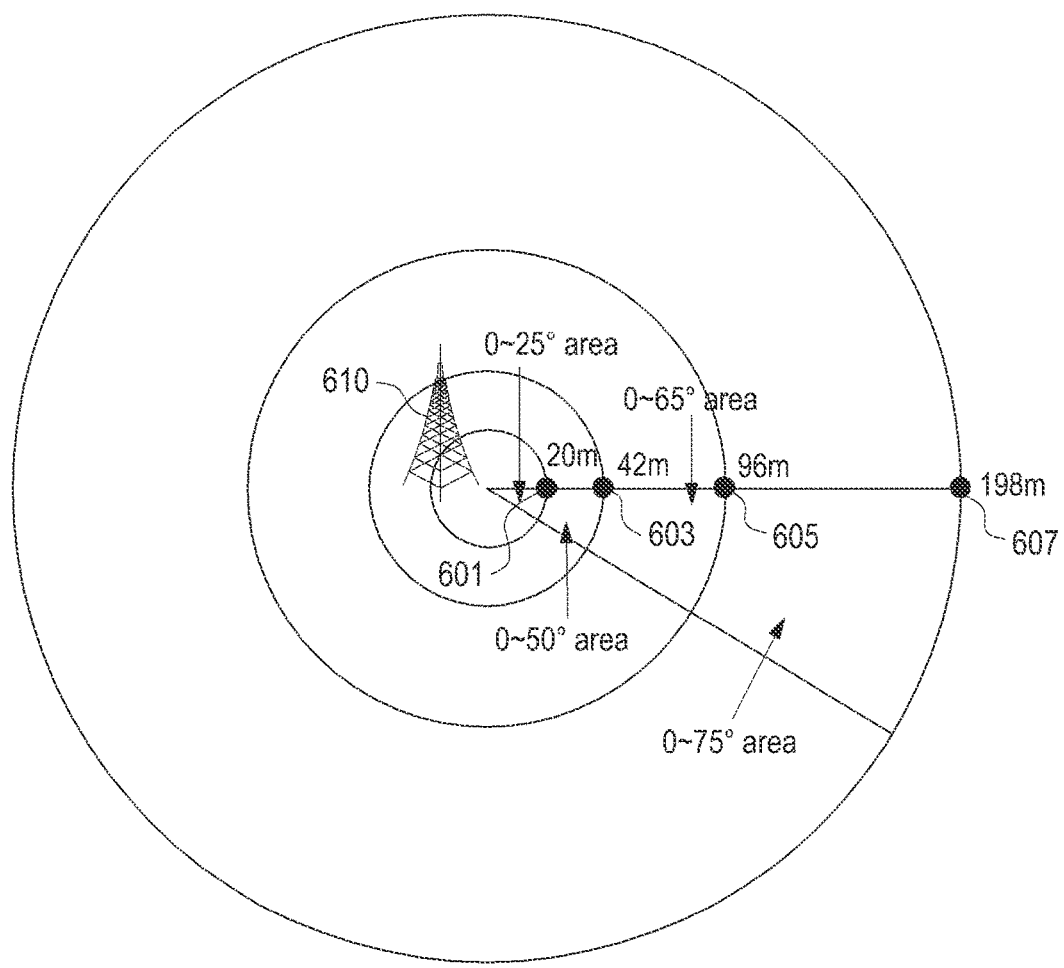
FIG. 6 illustrates an arrival range of the transmission beam according to an elevation angle in a beamforming communication system according to an embodiment of the present disclosure.

FIG. 6 illustrates an arrival range of a transmission beam according to an elevation angle in the beamforming communication system according to an embodiment of the present disclosure.

Referring to FIG. 6, a BS 610 of FIG. 6 is installed on the rooftop of a building. In the example illustrated in FIG. 6, a height of the installed BS 610 is 35 m and the service area of the BS 610 is approximately 200 m in radius.

For example, when there is no obstacle, a transmission beam of the BS 610 is transmitted up to a distance of 20 meters (m) within the service area of the BS 610 if the elevation angle is 25° as indicated by reference numeral 601, is transmitted up to a distance of 42 m if the elevation angle is 50° as indicated by reference numeral 603, is transmitted up to a distance of 96 m if the elevation angle is 65° as indicated by reference numeral 605, and is transmitted up to a distance of 198 m if the elevation angle is 75° as indicated by reference numeral 607. As illustrated in FIG. 6, the transmission beam of the BS 610 reaches a farther area as the elevation angle is increased, and the farther the transmission beam reaches, the wider an area in which the beam can be received.

Figure 7:
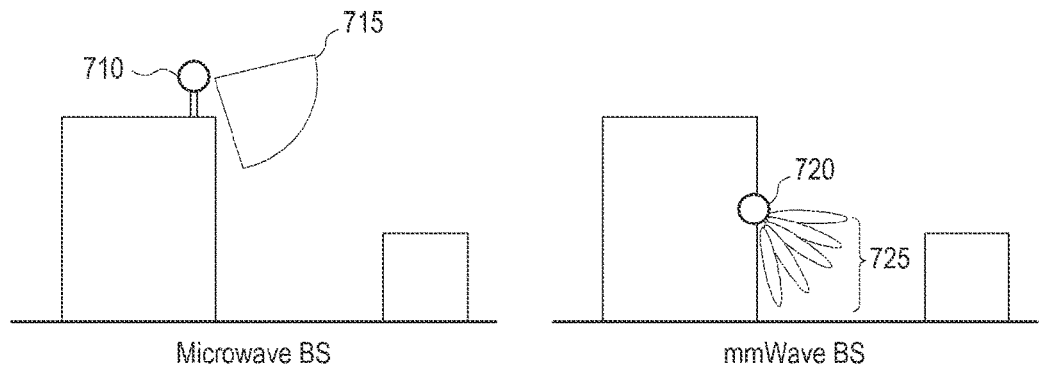
FIG. 7 illustrates an example in which a macro BS and a beamforming BS are installed according to an embodiment of the present disclosure.

FIG. 7 illustrates an example in which a macro BS and a beamforming BS are installed according to an embodiment of the present disclosure. The macro BS refers to a conventional BS which uses a beam of a relatively wide beam width without using beamforming.

Referring to FIG. 7, a macro BS 710 is generally located on the rooftop or upper floor of a building, and processes transmission/reception of a signal through a beam 715 having a wide beam width which covers a wide area. In contrast, a beamforming BS 720 supporting beamforming communication is designed to form the service area through a plurality of beams 725 having a narrow beam width. Further, due to miniaturization of a BS structure and an increase in the number of BSs according to a millimeter (mm) wave propagation characteristic, the BS 720 has been increasingly installed on walls of buildings or other structures, along roadsides and waterways, and on streetlamps, traffic signals, or other utility structures.

As illustrated in the example of FIG. 5, when the transmission beam having the elevation angle and azimuth of the narrow beam width is used, a plurality of available transmission beams and reception areas may exist within the BS. As described in the example of FIG. 7, when the height of the installed BS is low and a distance between a BS antenna and an outdoor MS is short, it is highly likely to generate beam switching and/or a sector handover at a physically close distance to the BS.

Figure 8:
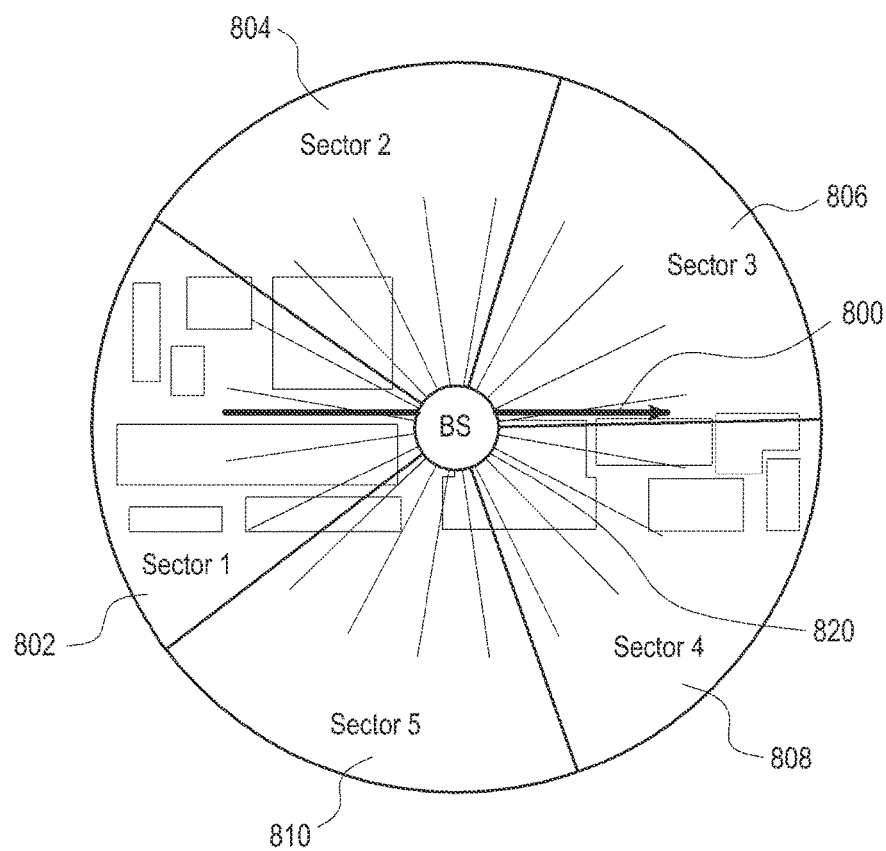
FIG. 8 illustrates an example of a sector configuration in a BS supporting beamforming communication according to an embodiment of the present disclosure.

FIG. 8 illustrates an example of a sector configuration in a BS supporting beamforming communication according to an embodiment of the present disclosure.

Referring to FIG. 8, a BS 820 may be located on the wall at the corner of a building but embodiments are not limited thereto. A plurality of sectors constitute one cell within the service area of the BS 820 and each sector has beams of a plurality of narrow widths. In the illustrated example, the BS 820 has five sectors 802, 804, 806, 808, and 810, and is configured to form four azimuth beams per sector. In practical use, each sector includes a plurality of beams determined by the azimuth and elevation angle. When the MS moves to sector #3 806 from sector #1 802 via sector #2 804 as indicated by arrow 800, an inter-sector handover may occur.

The mm wave has a characteristic corresponding to a rapid variation in signal strength according to a movement of the MS. Accordingly, a BS signal, for example, signal strength of sector #1 802 may rapidly decrease while the MS moves from an area close to the BS 820. When an SINR of the BS signal becomes equal to or smaller than −10 dB, the MS may generally have difficulty in receiving a handover command from the BS. Accordingly, the MS enters another sector while not normally receiving the handover command from the previous sector, thereby generating handover failure.

As described above, in order to reduce radio link failure (RLF) or handover failure generated due to an error of the measurement of the BS signal in the beamforming system, it is required to differently set parameters for the measurement report according to beam characteristics. For example, measurement parameter for a beam having frequent handover failure may be set to enable a faster measurement report compared to measurement parameters for other beams.

As described above, the MS measures the signal strength (that is, signal quality) of the RS transmitted through transmission beams of the BS and detectable transmission beams of neighboring BSs and reports the measurement result to the BS.

The MS may receive information required for the measurement report, that is, measurement information from the BS. The measurement information includes one or more measurement parameters and may be signaled through a broadcast message or a dedicated message. According to another embodiment of the present disclosure, the MS may pre-store a set of one or more pieces of measurement information when the MS is manufactured or sold.

The MS measures RSs which can be detected based on the measurement information. When the measurement result meets a predetermined trigger condition within the measurement information, the MS reports a measurement report message including the measurement result to the BS. According to another embodiment of the present disclosure, when the measurement result meets a predetermined trigger condition within the measurement information, the MS may inform a source BS of a handover and perform a handover process to a target BS, or may directly perform the handover process to the target BS without informing the source BS of the handover. In this case, the trigger condition is a condition for the handover and may be different from or same as the condition for the measurement report.

The measurement information includes, for example, measurement object information, reporting configuration information, measurement identity information, quantity configuration information, and measurement gap information, but embodiments are not limited thereto.

Measurement object information refers to information related to a target to be measured by the MS. The measurement object includes at least one of an intra-frequency measurement object and an inter-radio access technology (RAT) measurement object. For example, the intra-frequency measurement object may indicate a neighboring cell having a frequency band equal to that of the serving cell, the inter-frequency measurement object may indicate a neighboring cell having a frequency band different from that of the serving cell, and the inter-RAT measurement object may indicate a neighboring cell of an RAT different from that of the serving cell.

Reporting configuration information refers to information related to a trigger condition indicating when the MS reports the measurement result and a report type. The trigger condition may include information on an event or period for triggering the report on the measurement result. The report type corresponds to information related to a type in which the measurement result is configured.

Measurement identity information refers to information related to a measurement identity for determining a time and a type of the report of the measurement object by the MS based on a relationship between the measurement object and the reporting configuration. The measurement identity may be included in a measurement report message and may indicate the measurement object from which the measurement result is generated, and the report condition under which the measurement report is generated.

Quantity configuration information refers to parameters for configuring filtering of a measurement unit, report unit, and/or measurement result value.

Measurement gap information refers to information related to a measurement gap corresponding to an interval which can be used only for the measurement without consideration of data transmission between the MS and the serving cell.

Table 1 below shows examples of events for triggering the measurement report but embodiments are not limited thereto.

TABLE 1

| Event | Trigger condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

When the measurement result of the MS satisfies one of the events set in Table 1, the MS transmits a measurement report message to the BS.

The measurement report may include a measurement identity, measured quality, and a measurement result of a neighboring cell. The measurement identity identifies the measurement object of which the measurement report is triggered. The measurement result of the neighboring cell may include a cell identity and measured quality of the neighboring cell. The measured quality may include at least one of a CINR, RSSI, RSCP, RSRP, and RSRQ.

Based on a method according to one embodiment of the present disclosure, the BS may operate different measurement parameters according to each transmission beam or each transmission beam group.

The measurement parameters provided according to each transmission beam (group) by the BS may include at least one of the parameters shown in Table 2 below but embodiments are not limited thereto.

TABLE 2

| Parameter | Description |
| --- | --- |
| TTT(Time To Trigger) | TTT specifies the value range used for time to trigger parameter, which concerns the time during which specific criteria for the event needs to be met in order to trigger a measurement report |
| Offset | Offset is an offset value to be used in measurement report triggering condition for the event |
| Hysteresis (Qhyst) | Hysteresis is an index value for controlling frequency of the generation or release of the trigger condition |

A utilization example of measurement parameters for a particular event, for example, an event A3 is described in detail below.

When the event A3 is instructed by the BS, the MS triggers the event A3 if a value generated by subtracting the hysteresis value from signal strength measured for the neighboring cell is larger than a value generated by adding signal strength measured for the serving cell and A3-offset. When a state where the event A3 is continuously triggered during TTT, the MS transmits the measurement report to the BS. The MS may periodically transmit the measurement report according to a predetermined measurement period while a trigger condition of the event A3 is met. The same A3-offset and hysteresis value may be used for leaving the event A3. That is, when the value generated by adding the signal strength measured for the serving cell and A3-offsest is larger than a value generated by adding the signal strength measured for the neighboring cell and the hysteresis value, the MS may leave the event A3.

The beam or beam group identified to have more frequent handover failure or RLF may have at least one of a TTT value, A3-offset value, and hysteresis value, lower than those of the other beam or beam group.

According to another embodiment of the present disclosure, the BS may control at least one of information (event A2 or event A3) designating a trigger condition, layer 1/layer 2 filter conditions, and an elevation (and/or azimuth) of the beam such that the MS less frequently transmits the measurement report to the beam or beam group identified to have frequent handover failure or frequent handover generation, and may provide the MS with the controlled information according to each transmission beam (group).

The layer 1/layer 2 filter conditions are described in detail below.

The MS may perform processing in a physical layer corresponding to layer 1 and a data link layer or a medium access control (MAC) layer corresponding to a layer 2 when performing handover measurement. For the handover measurement, the MS may generally determine an RSRP estimation value for signals. The MS averages several RSRP samples to improve reliability of the RSRP estimation values. The averaging is performed in layer 1 and is generally referred to as L 1 filtering. For L 1 filtering, L 1 filtering conditions, for example, a time interval (that is, measurement period) for measuring RSRP samples and the number of RSRP samples to be averaged are used. For example, when a measurement period of 200 ms and a sample period of 40 ms are given, five pieces of data sampled in the unit of 40 ms are averaged.

L 1 filtered measurement values may be updated at every measurement period and averaged through a moving average (MA) filter to improve the accuracy. The averaging is generally referred to as L 3 filtering. For L 3 filtering, an L 3 filter condition, for example, a L 3 filtering coefficient corresponding to a weighted value of the MA filter is used. For example, an exponential averaging formula shown in Equation (1) below may be used.

$$F_n = (1-a)*F_{n-1} + a*M_n \qquad (1)$$

In Equation (1), a corresponds to $\frac{1}{2}^{(k/4)}$, wherein k denotes a filter coefficient which may be given by the BS. For example, if k=4, then a=0.5. Further, $M_n$ denotes a measurement result lastly measured from a physical layer, that is, L 1 filtered measurement value, $F_n$ denotes an updated filtered measurement result, and $F_{n-1}$ denotes a previously filtered measurement result.

For example, an L 3 filtering coefficient smaller than that of the other MSs may be used for the MS having frequent handovers.

Embodiments for configuring beam specific, measurement parameters according to beam specific characteristics will now be described with reference to detailed examples.

Figure 9:
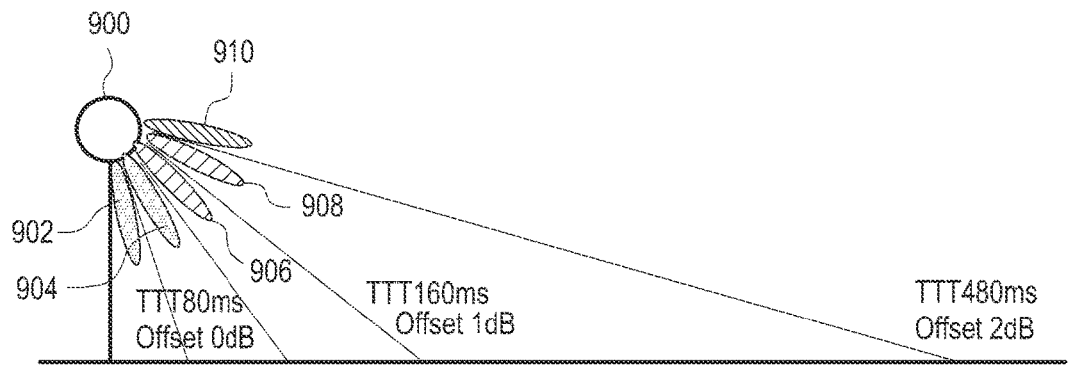
FIG. 9 illustrates an example of measurement parameters according to an embodiment of the present disclosure.

FIG. 9 illustrates an example of measurement parameters according to an embodiment of the present disclosure. In the illustrated example, parameters for measuring the RS are determined based on an elevation angle of the transmission beam of the BS.

Referring to FIG. 9, a BS 900 may operate five transmission beams 902, 904, 906, 908, and 910 having different elevation angles. Sequentially, the transmission beam 902 has a smallest elevation angle and the transmission beam 910 has a largest elevation angle. The transmission beams 902 and 904 having the small elevation angle form the coverage of a relatively small range and, accordingly, the MS within the coverage is highly likely to move to another beam area. Therefore, the transmission beams 902 and 904 having the small elevation angle have a relatively low TTT and offset value, thereby preventing the generation of the handover failure or RLF within the coverage. In contrast, the transmission beam 910 having the large elevation angle has a relatively high TTT and offset value.

In the illustrated example, the transmission beams 902 and 904 having a small elevation angle have a TTT of 80 ms and an offset of 0 dB. The transmission beams 906 and 908 having an elevation angle in an intermediate range have a TTT of 160 ms and an offset of 1 dB. The transmission beam 910 having an elevation in a high range has a TTT of 480 ms and an offset of 2 dB.

The classification of transmission beams and the configuration of measurement parameters may be variously performed. According to an embodiment of the present disclosure, measurement parameters configured according to each transmission beam or each transmission beam group may include at least one of a TTT, offset, hysteresis value, L 1 measurement period, the number of measurement samples, layer 3 (L) weight, and trigger condition.

Figure 10:
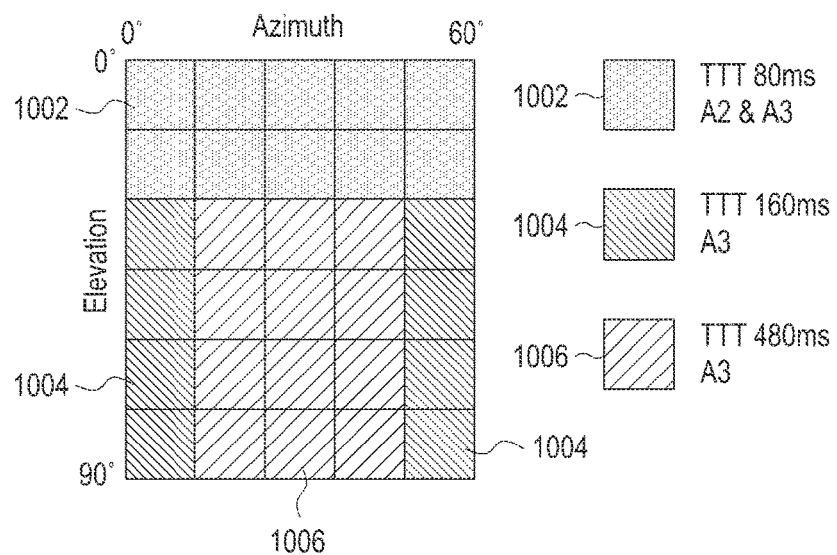
FIG. 10 illustrates another example of measurement parameters according to an embodiment of the present disclosure.

FIG. 10 illustrates another example of measurement parameters according to an embodiment of the present disclosure. In the illustrated example, parameters for measuring the RS may be determined based on ranges of an azimuth and an elevation angle of the transmission beam of the BS.

Referring to FIG. 10, transmission beams that cover one sector of the BS may be classified by the azimuth and the elevation angle. In the illustrated example, the transmission beams have azimuths ranging from 0 degrees to 60 degrees. At this time, a transmission beam having a large elevation angle, for example, an elevation angle equal to or smaller than a predetermined threshold has a lowest measurement parameter set. Transmission beams, which do not have a large elevation angle, have relatively high measurement parameter sets classified according to the azimuth.

In the illustrated example, the BS applies the TTT of 80 ms and trigger conditions of events A2 and A3 to the transmission beams 1002 having large elevation angles. The BS uses the TTT of 160 ms and a trigger condition of event A3 to the transmission beams 1004 which have intermediate and small elevation angles and are included in a boundary of the sector. For example, when a width of the sector is between 0 degrees and 60 degrees, transmission beams included in 20% areas of both boundaries may be classified as being included in the boundary of the sector. The BS uses the TTT of 480 ms and a trigger condition of event A3 for the transmission beams 1006 which have intermediate and small elevation angles and are included in the center of the sector. For example, when the width of the sector is between 0 degrees and 60 degrees, transmission beams included in 80% areas of both boundaries may be classified as being included in the center of the sector. Measurement parameters for each transmission beam may be carried on system information to be broadcasted or carried on a dedicated message to be signaled. The dedicated message is referred to as, for example, a measurement control message.

The BS may experimentally configure measurement parameters for all available transmission beams or transmission beam groups, or receive measurement parameters for transmission beams or transmission beam group from a system operator. According to an embodiment of the present disclosure, the BS may configure relatively low measurement parameter sets for a transmission beam or a transmission beam group which is determined to have relatively frequent handover failure. According to another embodiment of the present disclosure, the BS may configure relatively low measurement parameters for a transmission beam having an elevation angle larger than a predetermined threshold and configure relatively high measurement parameters for the other transmission beam. According to another embodiment of the present disclosure, the BS may configure relatively low measurement parameters for a transmission beam included in the boundary of the sector compared to a transmission beam included in the center of the sector. According to another embodiment of the present disclosure, measurement parameters may be configured according to an identity of a neighboring cell of a particular transmission beam. According to an embodiment of the present disclosure, one or more of configuration references of the above measurement parameters and additional configuration references, which have not been mentioned, may be combined and applied.

Figure 11:
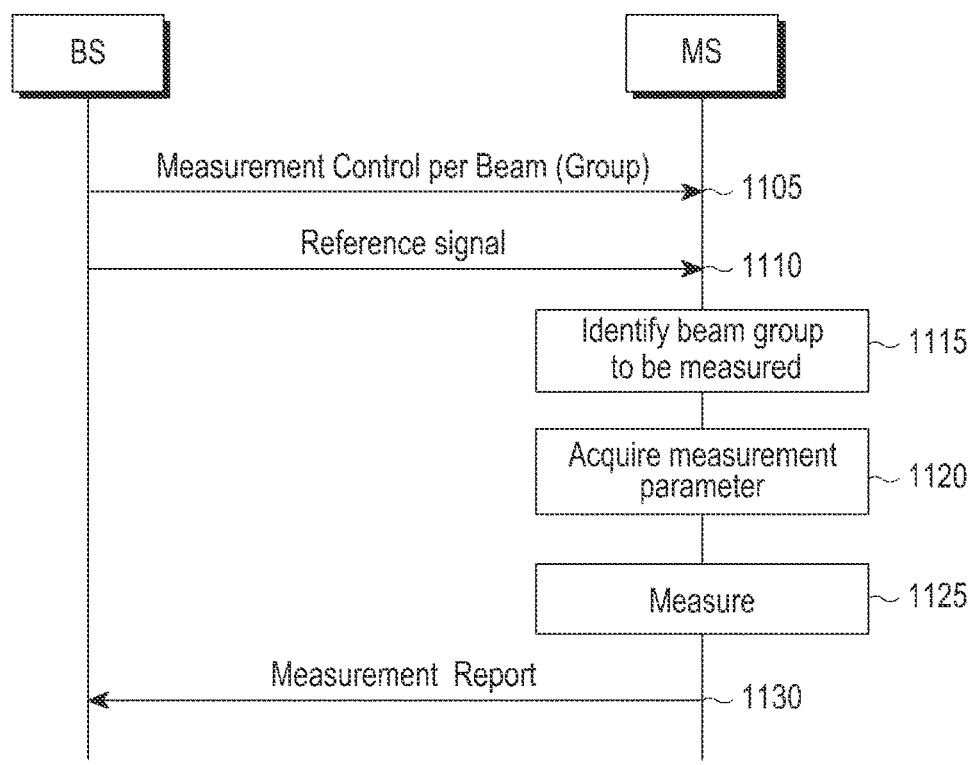
FIG. 11 is a message flow diagram illustrating a method for operating beam specific, measurement parameters according to an embodiment of the present disclosure.

FIG. 11 is a message flow diagram illustrating a method for operating beam specific, measurement parameters according to an embodiment of the present disclosure.

Referring to FIG. 11, in operation 1105, the BS broadcasts system information to the MS that carries measurement information containing measurement parameters for transmission beams, which can be transmitted, or transmits a dedicated message to the MS that carries the measurement information. The dedicated message may be referred to as, for example, a measurement control message. The configuration reference of the measurement parameters is equal to the above description. According to an embodiment of the present disclosure, the measurement information includes an identity of a transmission beam or a transmission beam group, and information on the corresponding transmission beam or a measurement parameter set of the transmission beam. The measurement information may include measurement parameters for all transmission beams. According to another embodiment of the present disclosure, the system information may include default measurement parameters applied to all transmission beams, and the BS may transmit an identity and a measurement parameter set of at least one transmission beam (or transmission beam group), to which the default measurement parameters are not applied, through a separate measurement configuration message.

In operation 1110, the BS transmits an RS through transmission beams which can be transmitted. For example, the BS transmits the RS by using time-frequency resources in different areas through transmission beams, as in the example illustrated in FIG. 4. The MS may identify the transmission beam corresponding to pre-arranged time-frequency resources.

The MS identifies a transmission beam to be measured in operation 1115, and acquires measurement parameters designated for the transmission beam or a transmission beam group including the transmission beam with reference to the received measurement information in operation 1120. In operation 1125, the MS receives and measures the RS transmitted through the time-frequency resources corresponding to the transmission beam by using the measurement parameters. The MS determines whether to report a result of the measurement by using the measurement parameters and, when it is determined that the report is needed, the MS transmits a measurement report message including signal strength according to the result of the measurement to the BS in operation 1130.

Figure 12:
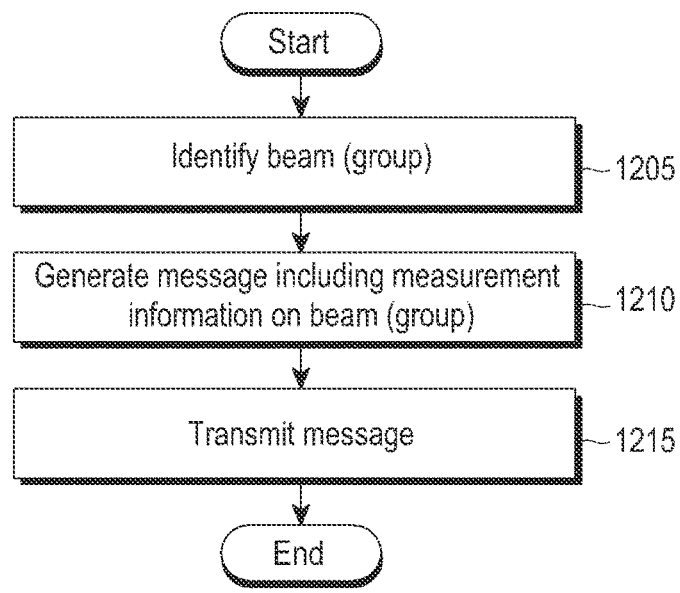
FIG. 12 is a flowchart illustrating operations of a BS according to an embodiment of the present disclosure.

FIG. 12 is a flowchart illustrating operations of a BS according to an embodiment of the present disclosure. In FIG. 12, basically determined measurement parameters are first assigned to transmission beams of the BS, but at least one transmission beam is determined to require reconfiguration of measurement parameters.

Referring to FIG. 12, in operation 1205, the BS identifies at least one transmission beam which requires reconfiguration of measurement parameters, among the transmission beams which can be transmitted. For example, the BS may identify at least one transmission beam which requires the reconfiguration of measurement parameters, according to at least one the elevation angle and the azimuth. In operation 1210, the BS generates a message including measurement information containing the measurement parameters for the transmission beam. The message may be system information or a dedicated message. According to a selectable embodiment of the present disclosure, the message may include measurement parameters for all transmission beams including the identified transmission beam. In operation 1215, the BS broadcasts or unicasts a message including the measurement information.

Figure 13:
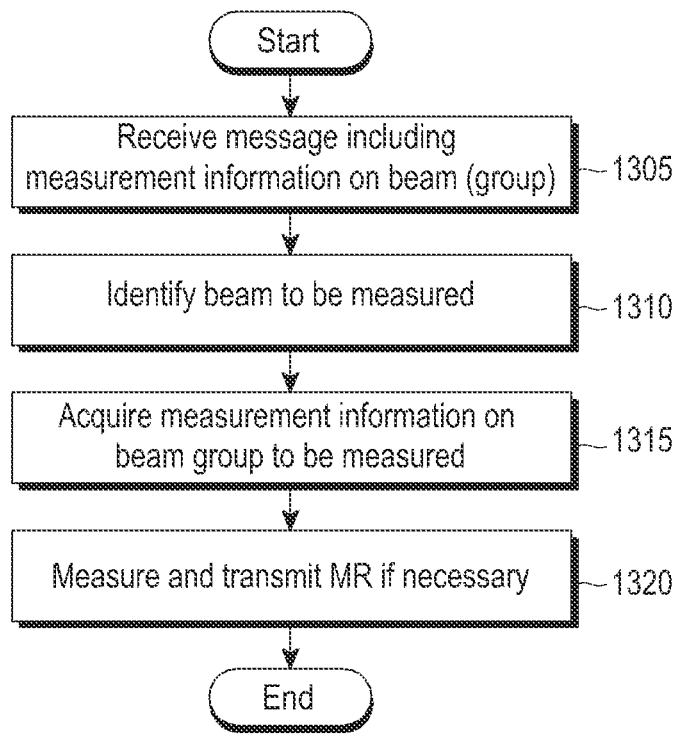
FIG. 13 is a flowchart illustrating operations of an MS according to an embodiment of the present disclosure.

FIG. 13 is a flowchart illustrating operations of an MS according to an embodiment of the present disclosure.

Referring to FIG. 13, in operation 1305, the MS receives a message including measurement parameters for at least one transmission beam of the BS from the BS. In operation 1310, the MS identifies the transmission beam to be measured. For example, the MS identifies the transmission beam corresponding to particular time-frequency resources in a resource area in which the RS is transmitted.

In operation 1315, the MS acquires measurement parameters corresponding to the transmission beam from the received message. According to a selectable embodiment of the present disclosure, the BS may acquire information on a particular transmission beam of the BS, for example, an elevation angle and/or an azimuth from the received message, and acquire a measurement parameter set corresponding to the elevation angle and/or the azimuth from a pre-stored table. According to another selectable embodiment of the present disclosure, the MS itself may acquire at least one of the TTT, offset value, hysteresis value, and elevation angle/azimuth corresponding to the transmission beam from the received message, and control a filtering condition and/or filtering period of signal strength measurement value according to the elevation angle/azimuth.

In operation 1320, the MS receives and measures the RS transmitted through the time-frequency resource corresponding to the transmission beam by using the measurement parameters, and transmits a measurement report when a trigger condition is met based on a result of the measurement.

According to an embodiment of the present disclosure, the MS may acquire transmission beam specific, handover parameters together with transmission beam specific, measurement parameters from the BS, and perform the handover by using the handover parameters.

For example, the measurement control message provided to the MS from the BS may include the following beam configuration information of Table 3 below.

TABLE 3

| Beam Configuration | |
|---|---|
| BeamID: 1-10 | HOUrgency: High |
| BeamID: 11-40 | HOUrgency: Mid |
| BeamID: Others | HOUrgency: Low |

According to the beam configuration information, a first beam group including transmission beams #1 to #10 has a high handover urgency, a second beam group including transmission beams #11 to #40 has a middle handover urgency, and a third beam group including the remaining transmission beams has a low handover urgency. In response to the beam configuration information, the MS itself may change the measurement parameters for transmission beams having a particular handover urgency. For example, a period of L1/L 3 filtering for transmission beams having the high handover urgency may be reduced.

In another example, the beam configuration information may have the following form of Table 4 below.

TABLE 4

| Beam Configuration | | |
|---|---|---|
| BeamID: 1-10 | L1 ScanningPeriod: ms 160 | L3 k: 1 |
| BeamID: 11-40 | L1 ScanningPeriod: ms 240 | L3 k: 2 |
| BeamID: Others | L1 ScanningPeriod: ms 240 | L3 k: 4 |

According to the beam configuration information, the first beam group including transmission beams #1 to #10 has a scanning period (that is, measurement period) of 160 ms for L 1 filtering and a filter coefficient k=1 for L 3 filtering, the second beam group including transmission beams #11 to #40 has a scanning period of 240 ms for L 1 filtering and a filter coefficient k=2 for L 3 filtering, and the third group including the remaining transmission beams has a scanning period of 240 ms for L 1 filtering and a filter coefficient k=4 for L 3 filtering. In response to the beam configuration information, the MS itself changes L1/L 3 filtering conditions for particular transmission beams. For example, the filter coefficient or the measurement period for L1/L 3 filtering for transmission beams having the high handover urgency may be reduced.

According to an embodiment of the present disclosure, the MS may report a beam specific capability to the BS, and the BS may provide beam specific, measurement parameters if the MS having the beam specific capability requires.

Figure 14:
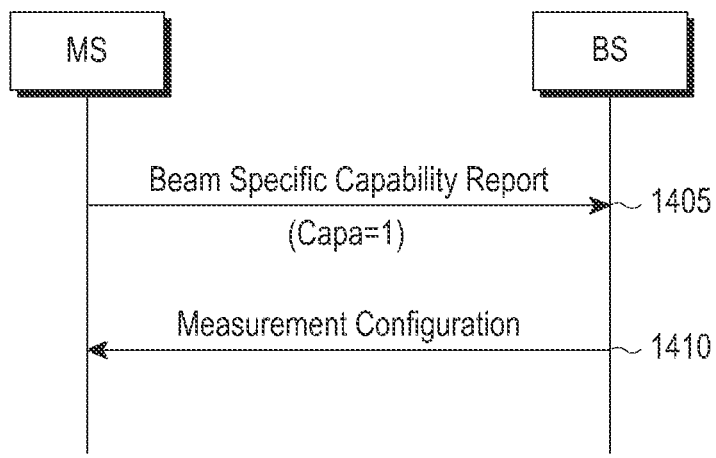
FIG. 14 is a message flow diagram illustrating operations for reporting beam specific capability according to an embodiment of the present disclosure.

FIG. 14 is a message flow diagram illustrating operations for reporting a beam specific capability according to an embodiment of the present disclosure.

Referring to FIG. 14, in operation 1405, the MS transmits a beam specific capability report message including information (capa=1), which indicates that a beam specific measurement can be performed, to the BS. In operation 1410, the BS provides a measurement control message including beam (beam group) specific, measurement parameters in response to the beam specific capability report message if necessary.

According to an embodiment of the present disclosure, when the RLF or the handover failure occurs while the MS communicates through a particular transmission beam, the MS reports information on the transmission beam to the BS and the BS re-configures measurement parameters for the transmission beam.

Figure 15:
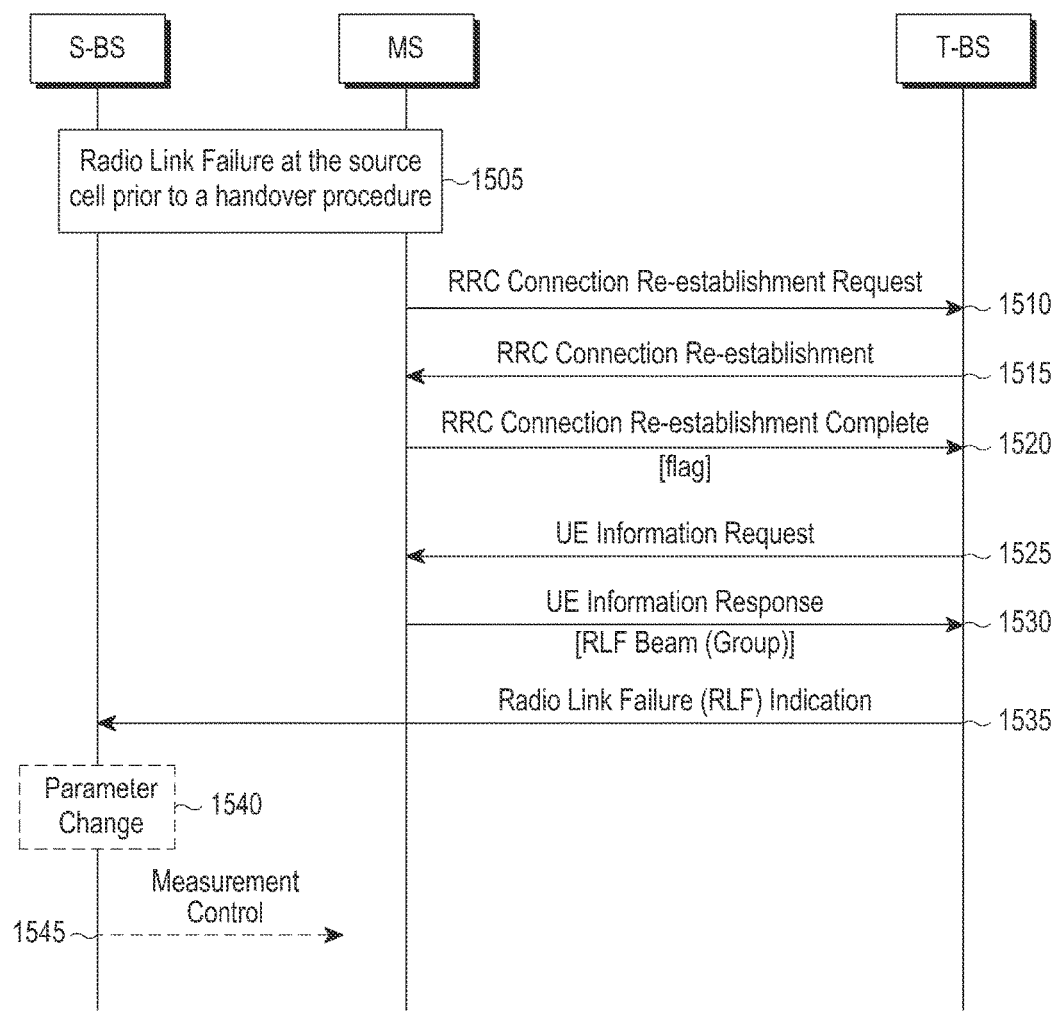
FIG. 15 is a message flow diagram illustrating a method for reporting radio link failure (RLF) according to an embodiment of the present disclosure.

FIG. 15 is a message flow diagram illustrating a method for reporting an RLF according to an embodiment of the present disclosure.

Referring to FIG. 15, in operation 1505, the MS detects the generation of the RLF during communication with a source BS. In operation 1510, the MS transmits a message for access re-configuration, for example, a radio resource control (RRC) connection re-establishment request message to a target BS detected through the handover process. The target BS transmits an RRC connection re-establishment message to the MS in operation 1515, and transmits an RRC connection re-establishment completion message in operation 1520. The RRC connection re-establishment completion message includes a flag indicating that the MS can report RLF information. In operation 1525, the BS detects the flag and transmits an MS information request message to the MS.

In operation 1530, the MS transmits an MS information response message to the BS in response to the reception of the MS information request message. The MS information response message includes information on a transmission beam having the RLF as well as reasons for the RLF such as timer expiration, random access problem, and exceeding of the maximum number of re-transmissions. The information on the transmission beam may be, for example, a beam index for identifying the transmission beam or a beam group index for identifying a beam group including the transmission beam. In operation 1535, the target BS inserts the information on the transmission beam having the RLF into an RLF indication message and transmits the RLF indication message to the source BS.

In operation 1540, the source BS may determine to change measurement parameters for the transmission beam having the RLF. For example, when the number of RLFs for a particular transmission beam is larger than a predetermined threshold, the source BS may change the measurement parameters for the transmission beam. When the measurement parameters are changed, system information or a measurement control message including the changed measurement parameters may be transmitted to the MS within the cell in operation 1545.

Figure 16:
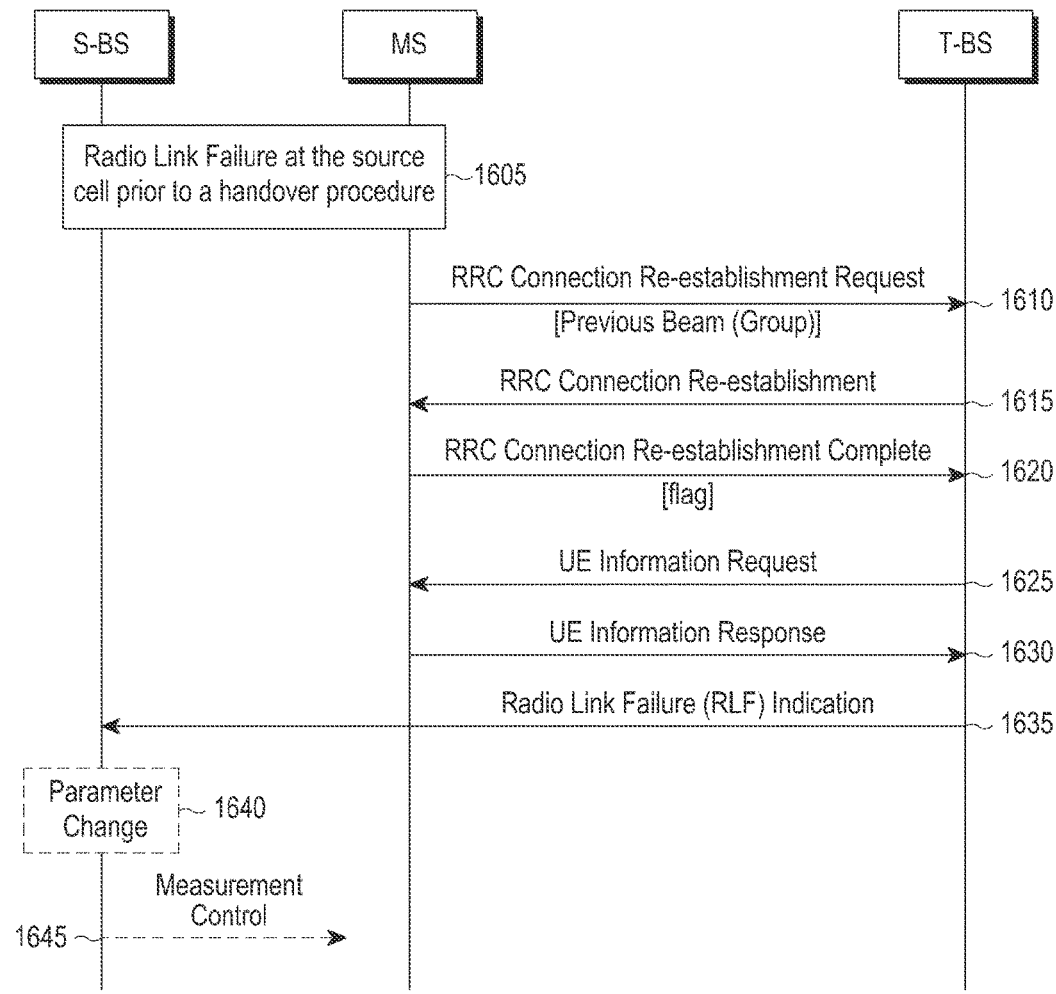
FIG. 16 is a message flow diagram illustrating a method for reporting RLF according to another embodiment of the present disclosure.

FIG. 16 is a message flow diagram illustrating a method for reporting an RLF according to another embodiment of the present disclosure.

Referring to FIG. 16, in operation 1605, the MS detects the generation of the RLF during communication with a source BS. In operation 1610, the MS transmits an RRC connection re-establishment request message to the target BS detected through the handover process. The RRC connection re-establishment request message includes information on the transmission beam, which the MS previously used, as well as reasons for the connection re-establishment such as reconfiguration failure and handover failure. The information on the transmission beam may be, for example, a beam index for identifying the transmission beam or a beam group index for identifying a beam group including the transmission beam.

The target BS transmits an RRC connection re-establishment message to the MS in operation 1615, and transmits an RRC connection re-establishment completion message in operation 1620. The RRC connection re-establishment completion message may include a flag indicating that the MS can report RLF information. In operation 1625, the BS detects the flag and transmits an MS information request message to the MS. In operation 1630, the MS transmits an MS information response message to the BS in response to the reception of the MS information request message. In operation 1635, the target BS inserts the information on the transmission beam having the RLF into an RLF indication message and transmits the RLF indication message to the source BS.

In operation 1640, the source BS may determine to change measurement parameters for the transmission beam having the RLF. For example, when the number of RLFs or handover failures for a particular transmission beam is larger than a predetermined threshold, the source BS may change the measurement parameters for the transmission beam. When the measurement parameters are changed, system information or a measurement control message including the changed measurement parameters may be transmitted to the MS within the cell in operation 1645.

According to an embodiment of the present disclosure, the MS may evaluate a channel condition according to signal strength and make a request for changing beam specific, measurement parameters to the BS if necessary. For example, when the MS determines that the signal strength seriously deteriorates or the handover is frequently generated, the MS may make a request for changing the beam specific, measurement parameters to the BS and receive a message including the beam specific, measurement parameters from the BS in response to the request.

Figure 17:
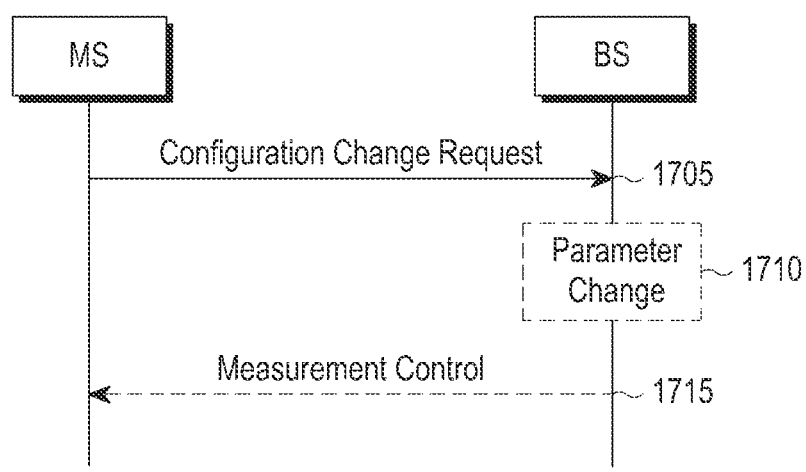
FIG. 17 is a message flow diagram illustrating operations in which an MS requests a change in measurement parameters according to an embodiment of the present disclosure.

FIG. 17 is a message flow diagram illustrating a method in which an MS requests a change in measurement parameters according to an embodiment of the present disclosure.

Referring to FIG. 17, in operation 1705, the MS transmits a configuration change request message for requesting the change in the measurement parameter from the BS. The configuration change request message may include information on the transmission beam for which the change in the measurement parameters is requested and a request type. The information on the transmission beam may be, for example, a beam index for identifying the transmission beam or a beam group index for identifying a beam group including the transmission beam. The request type may indicate, for example, a fast handover or a slow handover.

In operation 1710, the BS may determine to change the measurement parameters for the transmission beam in response to the request message. When the measurement parameters are changed, system information or a measurement control message including the changed measurement parameters may be transmitted to the MS in operation 1715.

Figure 18:
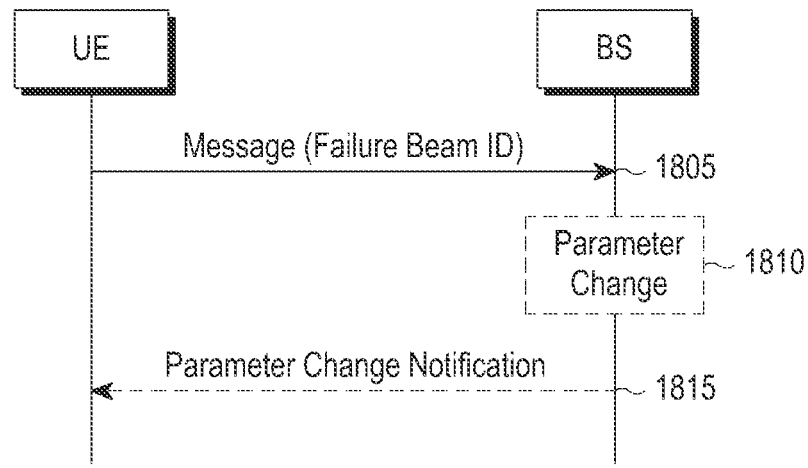
FIG. 18 is a flowchart illustrating a method in which a BS changes measurement parameters according to an embodiment of the present disclosure.

FIG. 18 is a flowchart illustrating a method in which a BS changes measurement parameters according to an embodiment of the present disclosure.

Referring to FIG. 18, in operation 1805, the BS, such as an evolved node B (eNB), receives a message including information required for changing beam configuration from the MS, such as a user equipment (UE). The message may be, for example, an MS information response message containing the reason of the RLF, an RRC connection re-establishment request message containing the reason of the handover failure, or a configuration change request message. In operation 1810, the BS applies changed measurement parameters for the transmission beam indicated by the message. In operation 1815, the changed parameters are transmitted to the MS by using system information, a measurement control message, or a separate message.

According to an embodiment of the present disclosure, the MS may directly change measurement parameters for a particular transmission beam based on information collected by the MS instead of receiving the changed measurement parameters for the particular transmission beam from the BS.

Figure 19:
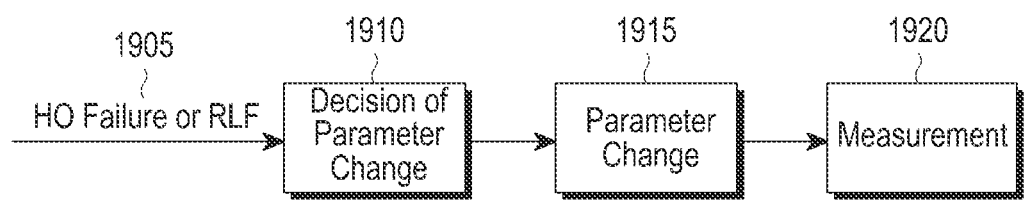
FIG. 19 is a flowchart illustrating a method of the change in a measurement parameters by an MS according to an embodiment of the present disclosure.

FIG. 19 is a flowchart illustrating a method of a change in measurement parameters by the MS according to an embodiment of the present disclosure.

Referring to FIG. 19, in operation 1905, the MS collects information required for changing measurement parameters. For example, the MS detects the handover failure or the RLF according to each transmission beam. In operation 1910, the MS determines that the change in the measurement parameter for a particular transmission beam is needed. For example, when the number of handover failures for a particular transmission beam generated within a predetermined time is larger than a predetermined threshold or when the number of RLFs is larger than a predetermined threshold, the MS may determine that the change in the measurement parameter for the transmission beam is needed. In operation 1915, the MS determines measurement parameters for the transmission beam according to a predetermined algorithm. For example, the MS may read a measurement parameter set for the fast handover from a memory. In operation 1920, the MS measures the transmission beam by applying the determined measurement parameters.

Figure 20:
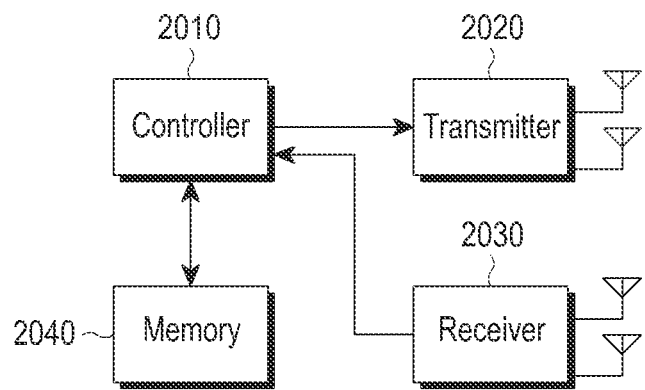
FIG. 20 is a block diagram illustrating a configuration of a BS according to an embodiment of the present disclosure.

FIG. 20 is a block diagram illustrating a configuration of a BS according to an embodiment of the present disclosure.

Referring to FIG. 20, the BS includes a controller 2010, a transmitter and antenna 2020, a receiver and antenna 2030 and a memory 2040, but embodiments are not limited thereto. The transmitter 2020 forms one or a plurality of transmission beams and transmits an RS, a control signal, and/or a data signal through at least one of the transmission beams under a control of the controller 2010. The controller 2010 generates signals to be transmitted through the transmitter 2020 and transmits the generated signals to the transmitter 2020. Particularly, the controller 2010 determines a measurement parameter set for each transmission beam and transmits a control signal including the measurement parameter set through the transmitter 2020. The receiver 2030 receives a control signal including a measurement report from the MS within the cell and transfers the received control signal to the controller 2010. The memory 2040 stores a program code and parameters required for the operation of the controller 2010.

Figure 21:
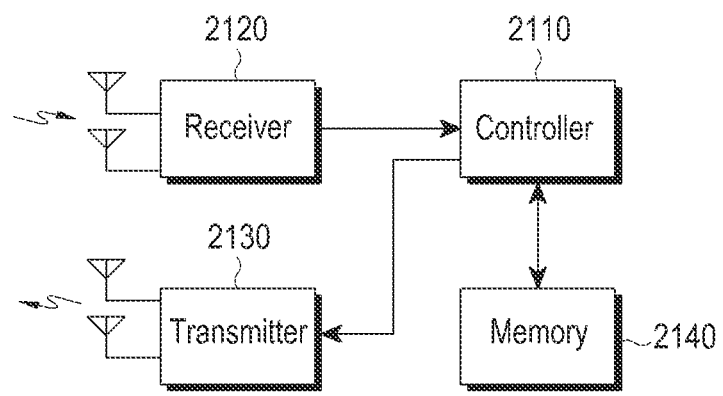
FIG. 21 is a block diagram illustrating a configuration of an MS according to an embodiment of the present disclosure.

FIG. 21 is a block diagram illustrating a configuration of an MS according to an embodiment of the present disclosure.

Referring to FIG. 21, the MS includes a controller 2110, a receiver and antenna 2120, a transmitter and antenna 2130 and a memory 2140, but embodiments are not limited thereto. The receiver 2120 forms one or a plurality of reception beams and receives an RS, a control signal, and/or a data signal through at least one of the reception beams under a control of the controller 2110. The controller 2110 decodes the signal received through the receiver 2120 to acquire a measurement parameter set for transmission beams of the BS, and evaluates a measurement result for the RS based on the measurement parameter set. When a trigger condition of a measurement report is met based on the measurement result, the controller 2110 may transmit the measurement report to the BS through the transmitter 2130. The memory 2140 stores a program code and parameters required for the operation of the controller 2110.

Through at least one of the various embodiments of the present disclosure implemented as described above, a probability of the handover failure can be reduced by configuring channel measurement parameters with respect to each transmission beam or each transmission beam group in a beamforming system.

While the present disclosure has been shown and described with reference to various embodiments thereof, it will be understood by those skilled in the art that various changes in form and details may be made therein without departing from the spirit and scope of the present disclosure as defined by the appended claims and equivalents.

What is claimed is:

1. A communication method using beamforming by a base station (BS), the communication method comprising:
    transmitting a measurement control message containing measurement information related to transmission beam groups, wherein a plurality of transmission beams of the BS are grouped into the transmission beam groups according to elevation angles of the plurality of transmission beams;
    transmitting reference signals through part of the plurality of transmission beams; and
    receiving a measurement report generated according to the measurement information from a mobile station (MS),
    wherein the measurement information includes identities and measurement parameter sets corresponding to the transmission beam groups,
    wherein the measurement parameter sets are used for measuring the reference signals and comprise parameters determined differently depending on ranges of the elevation angles corresponding to the transmission beam groups, and
    wherein, among the plurality of transmission beams having different elevation angles, at least one of:
        at least one transmission beam having an elevation angle larger than a threshold value has a measurement parameter set having values lower than a measurement parameter set of a transmission beam having an elevation angle equal to or smaller than the threshold value, or a transmission beam included in a boundary of a sector has a measurement parameter set having values lower than a measurement parameter set of a transmission beam included in the center of the sector.

2. The communication method of claim 1, wherein the measurement information on the transmission beam groups include at least one of:
   an event indicating a trigger condition for transmission of the measurement report,
   a time to trigger (TTT) indicating a time which meets a condition of an event for triggering the transmission of the measurement report,
   an offset value applied for evaluation of a serving cell with respect to the event,
   a hysteresis value applied for evaluation of a neighboring cell to trigger the transmission of the measurement report,
   a first layer and/or a second layer filtering condition for a measurement value of the reference signals,
   a first layer measurement period for measuring the reference signals and a number of measurement samples,
   the elevation angles and the azimuths corresponding to the plurality of transmission beams, and
   handover urgencies corresponding to the plurality of transmission beams.

3. The communication method of claim 1, further comprising:
   receiving a message for requesting a change in the measurement information from the MS,
   wherein the message for requesting the change in the measurement information includes at least one of:
      measurement report capabilities for the plurality of transmission beams,
      information on radio link failure (RLF), and
      information on handover failure.

4. The communication method of claim 1, wherein the measurement information comprises:
   an identity of a transmission beam, and
   information indicating the measurement parameter set applied to transmission beam.

5. A communication method using beamforming by a mobile station (MS), the communication method comprising:
   receiving, from a base station (BS), a message including measurement information related to transmission beam groups, wherein a plurality of transmission beams of the BS are grouped into the transmission beam groups according to elevation angles of the plurality of transmission beams;
   identifying the plurality of transmission beams to be measured;
   measuring reference signals transmitted through part of the plurality of transmission beams according to the measurement information; and
   transmitting a measurement report generated according to the measurement information to the BS,
   wherein the measurement information includes identities and measurement parameter sets corresponding to the transmission beam groups,
   wherein the measurement parameter sets are used for measuring the reference signals and comprise parameters determined differently depending on ranges of the elevation angles corresponding to the transmission beam groups, and
   wherein among the plurality of transmission beams having different elevation angles, at least one of:
      a transmission beam having an elevation angle larger than a threshold value has a measurement parameter set having values lower than a measurement parameter set of a transmission beam having an elevation angle equal to or smaller than the threshold value, or
      a transmission beam included in a boundary of a sector has a measurement parameter set having values lower than a measurement parameter set of a transmission beam included in the center of the sector.

6. The communication method of claim 5, wherein the measurement information on the transmission beam groups include at least one of:
   an event indicating a trigger condition for transmission of the measurement report,
   an offset value applied for evaluation of a serving cell with respect to the event,
   a hysteresis value applied for evaluation of a neighboring cell to trigger the transmission of the measurement report,
   a first layer and/or a second layer filtering condition for a measurement value of the reference signals,
   a first layer measurement period for measuring the reference signals and a number of measurement samples,
   the elevation angles and the azimuths corresponding to the plurality of transmission beams, and
   handover urgencies corresponding to the plurality of transmission beams.

7. The communication method of claim 5, further comprising:
   transmitting a message for requesting a change in the measurement information to the BS,
   wherein the message for requesting the change in the measurement information includes at least one of:
      measurement report capabilities for the plurality of transmission beams,
      information on radio link failure (RLF), and
      information on handover failure.

8. The communication method of claim 5, wherein the measurement information comprises:
   an identity of a transmission beam, and
   information indicating a measurement parameter set applied to transmission beam.

9. The communication method of claim 5, further comprising performing a handover process according to a result of the measurement of the reference signals.

10. A base station (BS) apparatus for performing communication by using beamforming, the BS apparatus comprising:
   a receiver configured to receive a signal from a mobile station (MS); and
   a controller configured to:
      transmit a measurement control message containing measurement information related to transmission beam groups, wherein a plurality of transmission beams of the BS is grouped into the transmission beam groups according to elevation angles of the plurality of transmission beams,
      transmit reference signals through part of the plurality of transmission beams, and
      receive a measurement report generated by the MS according to the measurement information from the received signal,
   wherein the measurement information on the transmission beam groups include identities and measurement parameter sets corresponding to the transmission beam groups, wherein the measurement parameter sets are used for measuring the reference signals and comprise parameters determined differently depending on ranges of the elevation angles corresponding to the transmission beam groups, and wherein among the plurality of transmission beams having different elevation angles, at least one of:
- at least one transmission beam having an elevation angle larger than a threshold value has a measurement parameter set having values lower than a measurement parameter set of a transmission beam having an elevation angle equal to or smaller than the threshold value, or
- at least one transmission beam included in a boundary of a sector has a measurement parameter set having values lower than a measurement parameter set of a transmission beam included in the center of the sector.

11. The BS apparatus of claim 10, wherein the measurement information on the transmission beam groups include at least one of:
- an event indicating a trigger condition for transmission of the measurement report,
- a time to trigger (TTT) indicating a time which meets a condition of an event for triggering the transmission of the measurement report,
- an offset value applied for evaluation of a serving cell with respect to the event,
- a hysteresis value applied for evaluation of a neighboring cell to trigger the transmission of the measurement report,
- a first layer and/or a second layer filtering condition for a measurement value of the reference signals,
- a first layer measurement period for measuring the reference signals and a number of measurement samples,
- the elevation angles azimuths corresponding to the plurality of transmission beams, and
- handover urgencies corresponding to the plurality of transmission beams.

12. The BS apparatus of claim 10,
wherein the receiver is further configured to receive a message for requesting a change in the measurement information from the MS, and
wherein the message for requesting the change in the measurement information includes at least one of:
- measurement report capabilities for the plurality of transmission beams,
- information on radio link failure (RLF), and
- information on handover failure.

13. The BS apparatus of claim 10, wherein the measurement information comprises:
- an identity of a transmission beam, and
- information indicating the measurement parameter set applied to transmission beam.

14. A mobile station (MS) apparatus for performing communication by using beamforming, the MS apparatus comprising:
- a receiver configured to receive a signal of a base station (BS); and
- a controller configured to:
  - control the receiver to receive, from the BS, a message including measurement information related to transmission beam groups, wherein a plurality of transmission beams of the BS are grouped into the transmission beam groups according to elevation angles of the plurality of transmission beams,
  - identify the plurality of transmission beams to be measured,
  - measure reference signals transmitted through part of the plurality of transmission beams according to the measurement information, and
  - transmit a measurement report generated according to the measurement information to the BS, wherein the measurement information on the transmission beam groups include identities and measurement parameter sets corresponding to the transmission beam groups, wherein the measurement parameter sets are used for measuring the reference signals and comprise parameters determined differently depending on ranges of the elevation angles corresponding to the transmission beam groups, and wherein among the plurality of transmission beams having different elevation angles, at least one of:
- a transmission beam having an elevation angle larger than a threshold has a measurement parameter set having values lower than a measurement parameter set of a transmission beam having an elevation angle equal to or smaller than the threshold value, or
- a transmission beam included in a boundary of a sector has a lower measurement parameter set having values lower than a measurement parameter set of a transmission beam included in the center of the sector.

15. The MS apparatus of claim 14, wherein the measurement information on the transmission beam groups include at least one of:
- an event indicating a trigger condition for transmission of the measurement report,
- a time to trigger (TTT) indicating a time which meets a condition of an event for triggering the transmission of the measurement report,
- an offset value applied for evaluation of a serving cell with respect to the event,
- a hysteresis value applied for evaluation of a neighboring cell to trigger the transmission of the measurement report,
- a first layer and/or a second layer filtering condition for a measurement value of the reference signals,
- a first layer measurement period for measuring the reference signals and a number of measurement samples,
- the elevation angles and the azimuths corresponding to the plurality of transmission beams, and
- handover urgencies corresponding to the plurality of transmission beams.

16. The MS apparatus of claim 14,
wherein the controller is further configured to transmit a message for requesting a change in the measurement information to the BS, and
wherein the message for requesting the change in the measurement information includes at least one of:
- measurement report capabilities for the plurality of transmission beams,
- information on radio link failure (RLF), and
- information on handover failure.

17. The MS apparatus of claim 14, wherein the measurement information comprises:
- an identity of a transmission beam, and
- information indicating a measurement parameter set applied to transmission beam.

18. The MS apparatus of claim 14, wherein the controller is further configured to perform a handover process according to result of the measurement of the reference signals.

* * * * *